United States Patent [19]

Trublowski et al.

[11] Patent Number: 5,705,104

[45] Date of Patent: Jan. 6, 1998

[54] METHOD FOR EMBEDDING CONDUCTORS IN A STRUCTURE

[75] Inventors: John Trublowski, Troy; Michael George Todd, South Lyon; Robert Edward Belke, Jr., West Bloomfield, all of Mich.

[73] Assignee: Ford Motor Company, Dearborn, Mich.

[21] Appl. No.: 644,398

[22] Filed: May 10, 1996

[51] Int. Cl.[6] .................. B29D 11/00; B32B 27/04
[52] U.S. Cl. .................. 264/1.25; 264/1.27; 264/249; 264/272.14; 264/272.15; 264/442; 264/443
[58] Field of Search .................. 264/1.25, 1.27, 264/249, 248, 271.1, 272.14, 272.15, 442, 443, 445, 449

[56] References Cited

U.S. PATENT DOCUMENTS

| | | | |
|---|---|---|---|
| 4,000,348 | 12/1976 | Harlow | 428/422 |
| 4,396,446 | 8/1983 | Franken | 264/1.25 |
| 4,444,709 | 4/1984 | Hayashi et al. | 264/174 |
| 4,646,436 | 3/1987 | Crowell et al. | 29/850 |
| 4,753,515 | 6/1988 | Sato et al. | 264/1.25 |
| 4,829,667 | 5/1989 | Thompson et al. | 29/858 |
| 4,944,087 | 7/1990 | Landi | 29/848 |
| 4,980,016 | 12/1990 | Tada et al. | 156/629 |
| 5,220,488 | 6/1993 | Denes | 361/398 |
| 5,249,245 | 9/1993 | Lebby et al. | 264/1.25 |
| 5,372,665 | 12/1994 | Chafin et al. | 156/73.1 |
| 5,462,622 | 10/1995 | Small et al. | 156/245 |
| 5,481,633 | 1/1996 | Mayer | 264/1.25 |
| 5,482,658 | 1/1996 | Lebby et al. | 264/272.15 |
| 5,496,435 | 3/1996 | Abbott | 264/272.15 |

*Primary Examiner*—James P. Mackey
*Attorney, Agent, or Firm*—Leslie C. Hodges; Roger L. May

[57] ABSTRACT

A method, and an article produced according to the method, for embedding conductors in a structure having a signal distribution function associated therewith such as a vehicle instrument panel. The method includes embedding a conductor in a film, and molding a material to the film such that the material and the film integrally form the structure. The method also includes attaching a connector to the integral structure so that the connector is provided in communication with the conductor.

19 Claims, 2 Drawing Sheets

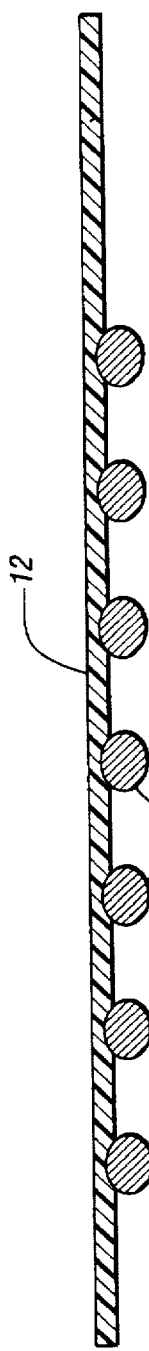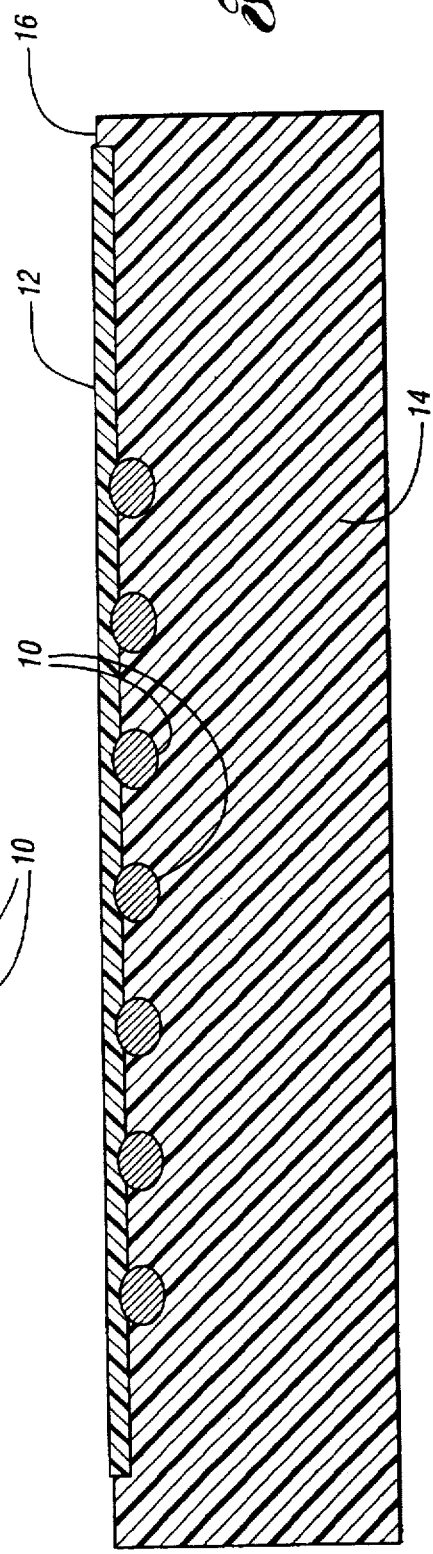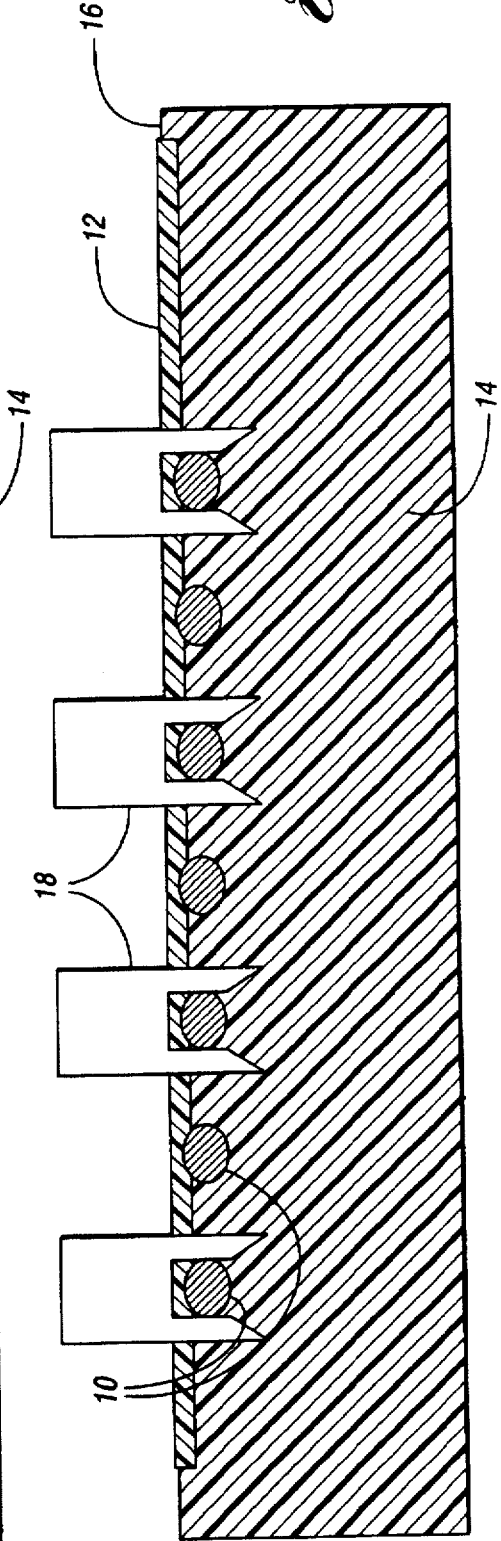

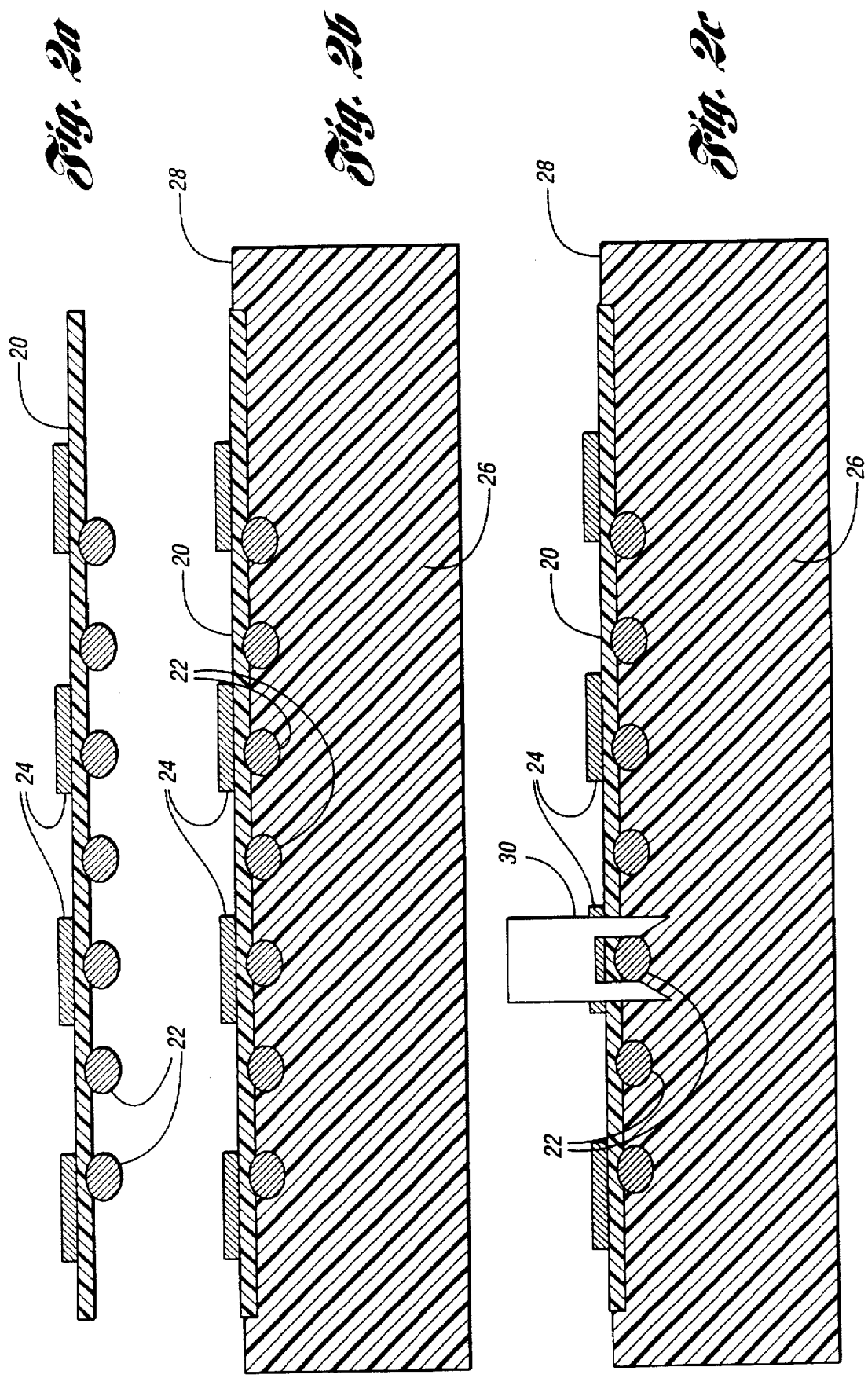

METHOD FOR EMBEDDING CONDUCTORS IN A STRUCTURE

TECHNICAL FIELD

This invention relates to a molding method for embedding conductors in a material and a structure, such as a vehicle instrument panel or the like, produced by that method.

BACKGROUND ART

Typically, a vehicle instrument panel assembly includes multiple wire harnesses providing electrical communication for various electronic instrument panel components such as a sound system, anti-lock brake module, engine control module, air bag module, as well as many other components. As is readily apparent, this assembly can consume a substantial amount of space beneath the instrument panel.

It is, therefore, desirable to provide a method and structure for integrating such wire harnesses or other electrical conductors and/or connectors in a vehicle instrument panel or other large vehicle interior subsystems having signal distribution applications. Such a method and structure would permit more efficient use of vehicle space while also improving manufacturing time and costs, as well as product performance. Ideally, such a method and structure would also be environmentally robust with rapid, cost effective and robust means for establishing electrical connections associated therewith.

In that regard, various techniques for attaching, molding and embedding electrical conductors and/or components are known in the art, such as those disclosed in U.S. Pat. Nos. 5,462,622 issued to Small et al., 5,220,488 issued to Denes, and 4,646,436 issued to Crowell et al. Such techniques, however, are not applicable to the integration of wire harnesses or other electrical conductors and/or connectors in vehicle instrument panel or other large vehicle interior subsystems having signal distribution applications.

SUMMARY OF THE INVENTION

Accordingly, it is the principle object of the present invention to provide a method for embedding conductors in a structure such as a vehicle instrument panel or other large vehicle interior subsystems having signal distribution applications.

Another object of the present invention is to provide an article, such as a vehicle instrument panel or other large vehicle interior subsystems having signal distribution applications, produced in accordance with the method for embedding conductors in a structure.

According to the present invention then, a method is provided for embedding conductors in a structure having a signal distribution application associated therewith such as a vehicle instrument panel. The method comprises embedding a conductor in a film, and molding a material to the film such that the material and the film integrally form the structure. The method also comprises attaching a connector to the integral structure so that the connector is provided in communication with the conductor.

According to an alternative embodiment of the present invention, a method is provided for embedding electrical conductors in a structure such as a vehicle instrument panel or the like. Such an embodiment of the method comprises embedding an electrical conductor in a film, and molding a polymer material about the film such that the material and the film integrally form the structure. Such an embodiment of the method also comprises embedding an electrical connector in the integral structure so that the electrical connector is provided in electrical communication with the electrical conductor.

The present invention also provides for structures produced in accordance with the above described methods.

These and other objects, features and advantages will be readily apparent upon consideration of the following detailed description in conjunction with the accompanying drawings.

BRIEF DESCRIPTION OF THE DRAWINGS

FIG. 1a is a cross-sectional view of a film with conductors for use in the method and structure of the present invention;

FIG. 1b is a cross-sectional view of a film with conductors molded to a material according to the method and structure of the present invention;

FIG. 1c is a cross-sectional view of a film with conductors molded to a material having interconnects according to the method and structure of the present invention;

FIG. 2a is a cross-sectional view of an alternative film with conductors for use in the method and structure of the present invention;

FIG. 2b is a cross-sectional view of an alternative film with conductors molded to a material according to the method and structure of the present invention; and FIG. 2c is a cross-sectional view of an alternative film with conductors molded to a material having interconnects according to the method and structure of the present invention.

BEST MODE FOR CARRYING OUT THE INVENTION

With reference to the drawings, the preferred embodiment of the present invention will now be described. Referring first to FIG. 1a, a cross-sectional view of a film with conductors for use in the method and structure of the present invention is shown. As seen therein, a plurality of conductors (10) are embedded into a film (12). In that regard, as used herein, the term embedded is not intended to be defined as completely within. Rather, embedded is defined herein as at least partially within.

Conductors (10) are preferably insulated wires, but other types of conductors may also be used including bare wires, metal strands or optical fibers. Conductors (10) may be of any pattern, including simply multiple parallel conductors such as in a wire harness. While conductors (10) are preferably embedded into film (12) ultrasonically, other techniques well known in the art may also be used.

Similarly, while film (12) is preferably a polymer, and more preferably a monolithic polymer, other materials and/or structures may be used including, but not limited to, multi-laminar polymers, adhesive-coated metal foils/films, adhesive-coated polymers, metal/polymer laminates/composites, reinforced polymers, and ceramic and glass layers. The material of film (12) may also be modified with various types of fillers. If a polymer, film (12) is generally an engineering thermoplastic resin typically having a thickness of approximately 5–10 mils, although other resins and dimensions may be used.

Referring next to FIG. 1b, a cross-sectional view of the film (12) with conductors (10) of FIG. 1a is shown molded to a material according to the method and structure of the present invention. Preferably, film (12) is placed onto the face of an injection molding tool (not shown), with insulated wires (10) facing into the center of the tool cavity.

The injection molding tool is subsequently closed and injected with a material for final molding of a part (14). The resulting molded part (14), such as a vehicle instrument panel or another large vehicle interior subsystem having signal distribution applications, has signal traces (conductors (10)) embedded just under the surface (16) of the part (14). In the example discussed above, wherein the film has a thickness of approximately 5 mils, molded part (14) will have circuit traces (10) embedded approximately 3 mils under surface (16).

As described above, molded part (14) is preferably injection molded, such as by blow molding or low pressure molding. However, molded part (14) may also be formed by other molding processes well known in the art including, but not limited to, transfer molding, compression molding, lamination, vacuum autoclaving, and co-extrusion.

Similarly, while the location for conductors (10) in molded part (14) described above is preferable, it should be noted that conductors (10) may be located anywhere on or in molded part (14), including surface (16) or within molded part (14). In that regard, conductors (10) need not be proximate surface (16), nor run parallel to surface (16) or any other surface of molded part (14). The only requirement concerning the location of conductors (10) is that some portion thereof be located close enough to a surface of molded part (14) so that external communication may be established therewith, preferably as described in greater detail below with regard to FIG. 1c.

The material chosen for molded part (14) is preferably a polymer such as a thermoplastic resin, although other types of materials may be used including, but not limited to, thermoset polymers, elastomers, molten metals, and sol-gels (ceramics). Moreover, the material is also preferably similar to that of film (12). In that regard, the thermoplastic resin used for molded part (14) may be modified with a filler, or have a different melt viscosity than that of film (12). In any event, the thermoplastic resin used is preferably either the chemical equivalent or at least miscible with respect to film (12). For example, if the film (12) comprises polystyrene, the thermoplastic resin used for molded part (14) may comprise PPO injection molded resin. Alternatively, film (12) and molded part (14) need not comprise miscible materials. Instead, an adhesive could be applied between film (12) and part (14). While such an adhesive could be continuous, it could also be discontinuous to provide for thermal expansion of film (12) and/or part (14).

Referring next to FIG. 1c, a cross-sectional view of the film (12) with conductors (10) molded in part (14) is shown having interconnects according to the method and structure of the present invention. More specifically, the method and structure of the present invention also entail providing for the interconnection of external conductors (not shown) to the embedded conductors (10) with the use of at least one interconnect device. While such a device is preferably an embedded insulation displacement connector (18), other similar devices or techniques may also be used.

Insulation displacement connectors (18) are embedded or staked into predetermined locations of the molded part (14). While connectors (18) are preferably embedded into the material of molded part (14) ultrasonically, other techniques well known in the art may also be used. In that regard, the design of the connectors (18), well known in the art, not only provides for energy coupling to an ultrasonic horn for embedding in molded part (14), but also incorporates features which establish electrical contact between conductors (10) and connectors (18). Connectors (18) can then be connected to conventional external connectors (not shown) or soldered/crimped (not shown). Once again, as used herein, the term embedded is not intended to be defined as completely within. Rather, embedded is defined herein as at least partially within.

Other techniques may also be mixed with the basic concept of the method and structure of the present invention. In that regard, referring now to FIG. 2a, a cross-sectional view of an alternative film (20) with conductors (22) for use in the method and structure of the present invention is shown. As seen therein, prior to embedding, film (20) film may be provided with conventional lithographed circuitry (24) on one or both sides. Circuitry (24) could also be formed on film (20) through other techniques such as the embossing or printing of a conductor. As with conductors (10) described above with respect to FIGS. 1a–c, circuitry (24) may be of any pattern.

Referring next to FIG. 2b, a cross-sectional view of the film (20) with conductors (22) of FIG. 2a is shown molded to a material according to the method and structure of the present invention. As seen therein, a molded part (26) is formed with conductors (22) located just beneath a surface (28) of molded part (26), and with circuitry (24) located on surface (28). In that regard, the molding of part (26) is preferably undertaken in the same fashion as described above with respect to FIG. 1b.

Referring finally to FIG. 2c, a cross-sectional view of the film (20) with conductors (22) molded in part (26) is shown having insulation displacement connectors (30) according to the method and structure of the present invention. As described above with respect to FIG. 1c, connectors (30) are embedded or staked, preferably ultrasonically, into predetermined locations of the molded part (26) to establish communication between conductors (22) and connectors (30).

As also seen in FIG. 2c, however, in this embodiment of the method and structure of the present invention, connectors (30) may also be provided in communication with circuitry (24), such as by soldering (not shown) or other known techniques. In any event, connectors (30) can once again then be connected to conventional external connectors (not shown) or soldered/crimped (not shown).

The method and structure of the present invention may also be extended to provide for multi-layer circuits. In that regard, following molding according to the method of the present invention as described above, the resulting structure may have additional outer circuitry defined using conventional lithography or plating processes. Referring again to FIGS. 1a–c, such circuitry may be interconnected with the ultrasonically embedded conductors (10) through the use of the insulation displacement connectors (18) previously described, plated through holes (not shown), or other similar features. Multiple layers (not shown) of ultrasonically embedded conductors (10) can also be added to provide for additional layers of circuitry.

Another related structure involves the use of embedded conductors (10) on both sides (not shown) of the film (12) to be placed in the injection molding tool. Once again, interconnection between such conductors (10) may be provided through the use of the insulation displacement connectors (18) previously described, plated through holes (not shown), or other similar features.

Once again, while the method and structure of the present invention are preferably used with engineering and thermoplastic resins, they are not necessarily limited to such materials. Lower temperature thermoplastic resins and/or elastomers can also be used provided the thermal demands of subsequent connections and component attachment techniques are met. The method and structure of the present invention also are not limited to thermoplastic resins, but may have utility with thermosetting resins such as phenol-formaldehyde or anhydride cure epoxy resins. The use of the latter provides less sensitivity to film/molding resin compatibility issues. Additional materials for film (12) and/or molded part (14) have been set forth in greater detail above.

It should also be noted that the materials used according to the method and structure of the present invention require material characteristics which meet various electrical/electronic specifications concerning manufacturing and operational environments. More specifically, the materials must exhibit adequate physical, thermal, environmental, and electrical properties to meet the requirements of the intended application.

Structures produced according to the method of the present invention permit functions traditionally provided using many separate components such as wire harnesses and/or other conductors and/or connectors to be combined with each other and a vehicle instrument panel or another large vehicle interior subsystem having signal distribution applications to form a single integrated component. Because of the various designs three-dimensional molded circuitry can take, circuitry and interconnections become integrated into the subsystem assembly infrastructure. Thus, designers can integrate circuitry with plastics to reduce cost, size and parts count, while increasing reliability and facilitating manufacturability.

The reduction of individual parts requiring assembly/disassembly and interconnection also increases reliability and serviceability in the field and lowers manufacturing cycle time. Structures produced according to the method of the present invention also provide for improved recyclability, requiring fewer process steps and resulting in more recoverable materials. Metal content can be easily stripped by wet chemical processing and separated for reclamation. Remaining polymers are generally 100% recyclable.

As is readily apparent from the foregoing detailed description, the present invention provides a method for embedding conductors in a structure such as a vehicle instrument panel or other large vehicle interior subsystems having signal distribution applications. Still further, the present invention also provides an article, such as a vehicle instrument panel or other large vehicle interior subsystems having signal distribution applications, produced in accordance with the method of the present invention for embedding electrical conductors in a structure.

It is to be understood that the present invention has been described in an illustrative manner and that the terminology which has been used is intended to be in the nature of words of description rather than of limitation. As those of ordinary skill in the art will recognize, many modifications and variations of the present invention are possible in light of the above teachings. Therefore, it is also to be understood that, within the scope of the following claims, the invention may be practiced other than as specifically described above.

What is claimed is:

1. A method for embedding conductors in a structure having a signal distribution application associated therewith, the method comprising:

embedding a conductor in a film;

molding a material to the film such that the material and the film integrally form the structure; and attaching a connector to the integral structure so that the connector is provided in communication with the conductor.

2. The method of claim 1 wherein the material is molded to the film such that the conductor of the film is proximate a surface of the integral structure.

3. The method of claim 1 wherein embedding a conductor in the film includes ultrasonically heating the film.

4. The method of claim 1 wherein molding a material to the film such that the material and the film integrally form the structure includes:

providing a molding tool;

orienting the film relative to the molding tool; and injecting the material into the molding tool.

5. The method of claim 1 wherein attaching a connector to the integral structure includes ultrasonically embedding a connector in the structure.

6. The method of claim 1 wherein the material comprises a polymer.

7. The method of claim 1 wherein the film comprises a polymer.

8. The method of claim 1 wherein the conductor and the connector are optical.

9. The method of claim 1 wherein the structure having a signal distribution application associated therewith comprises a vehicle instrument panel.

10. A method for embedding electrical conductors in a structure, the method comprising:

embedding an electrical conductor in a film;

molding a polymer material about the film such that the material and the film integrally form the structure; and embedding an electrical connector in the integral structure so that the electrical connector is provided in electrical communication with the electrical conductor.

11. The method of claim 10 wherein the polymer material is molded about the film such that the electrical conductor of the film is embedded proximate a surface of the integral structure.

12. The method of claim 10 wherein embedding an electrical conductor in a film includes ultrasonically heating the film.

13. The method of claim 10 wherein molding a polymer material about the film such that the material and the film integrally form the structure includes:

providing a molding tool;

orienting the film relative to the molding tool; and injecting the material into the molding tool.

14. The method of claim 10 wherein the embedded electrical connector comprises an insulation displacement connector and embedding an electrical connector in the integral structure includes ultrasonically heating the structure.

15. The method of claim 10 wherein the polymer material comprises a thermoplastic resin.

16. The method of claim 10 wherein the polymer material comprises a thermosetting resin.

17. The method of claim 10 wherein the film comprises a polymer.

18. The method of claim 10 further comprising providing a further conductor on a surface of the film.

19. The method of claim 10 wherein the structure comprises a vehicle instrument panel.

* * * * *